United States Patent
Cranford et al.

(10) Patent No.: US 7,556,677 B2
(45) Date of Patent: Jul. 7, 2009

(54) SOLVENT RESISTANT ASYMMETRIC INTEGRALLY SKINNED MEMBRANES

(75) Inventors: Richard Cranford, Cap-Rouge (CA); Christian Roy, Sillery (CA)

(73) Assignee: Vaperma Inc., Saint-Romuald (CA)

( * ) Notice: Subject to any disclaimer, the term of this patent is extended or adjusted under 35 U.S.C. 154(b) by 574 days.

(21) Appl. No.: 11/332,393

(22) Filed: Jan. 17, 2006

(65) Prior Publication Data

US 2006/0117955 A1     Jun. 8, 2006

Related U.S. Application Data

(63) Continuation-in-part of application No. PCT/CA2004/001047, filed on Jul. 16, 2004.

(30) Foreign Application Priority Data

Jul. 18, 2003    (CA)    ................... 2,435,538

(51) Int. Cl.
    *B01D 53/22* (2006.01)
(52) U.S. Cl. .................... 96/14; 96/8; 96/10; 96/12; 96/13; 95/45; 95/52; 95/54; 210/490; 210/640; 210/500.23; 210/500.28; 210/500.39; 264/5; 264/8; 264/347
(58) Field of Classification Search .......... 96/4, 96/8, 10, 11, 12, 13, 14; 95/45, 50, 51, 52, 95/54; 210/490, 640, 641, 650, 500.23, 500.28, 210/500.39; 264/5, 8, 347
    See application file for complete search history.

(56) References Cited

U.S. PATENT DOCUMENTS

| 3,133,132 | A | 5/1964 | Loeb et al. |
|---|---|---|---|
| 4,113,628 | A | 9/1978 | Alegranti |
| 4,440,643 | A | 4/1984 | Makino et al. |
| 4,460,526 | A | 7/1984 | Makino et al. |
| 4,532,041 | A | 7/1985 | Shuey et al. |
| 4,690,873 | A | 9/1987 | Makino et al. |
| 4,705,540 | A | 11/1987 | Hayes |
| 4,717,394 | A | 1/1988 | Hayes |
| 4,772,391 | A | 9/1988 | Baker et al. |
| 4,774,038 | A | 9/1988 | Ditter et al. |
| 4,778,688 | A | 10/1988 | Matson |
| 4,812,269 | A | 3/1989 | Harttig et al. |
| 4,830,640 | A | 5/1989 | Nakamura et al. |
| 4,902,422 | A | 2/1990 | Pinnau et al. |

(Continued)

FOREIGN PATENT DOCUMENTS

EP    0 761 291    3/1997

OTHER PUBLICATIONS

Van't Hof et al., Journal of Membrane Science, vol. 70, pp. 17-30, 1992.

(Continued)

*Primary Examiner*—Jason M Greene
(74) *Attorney, Agent, or Firm*—Bereskin & Parr

(57) ABSTRACT

There is provided an asymmetric integrally skinned membrane comprising a polyimide and another polymer selected from the group consisting of polyvinylpyrrolidone, sulfonated polyetheretherketones and mixtures thereof. The membrane which is substantially insoluble in an organic solvent and substantially defect-free can be useful as a separation membrane. Methods for preparing asymmetric integrally skinned polyimide membranes are also disclosed

25 Claims, 6 Drawing Sheets

U.S. PATENT DOCUMENTS

| | | |
|---|---|---|
| 4,929,405 A | 5/1990 | Kohn |
| 4,952,220 A | 8/1990 | Langsam et al. |
| 4,964,990 A | 10/1990 | Kraus et al. |
| 4,978,430 A | 12/1990 | Nakagawa et al. |
| 4,988,371 A | 1/1991 | Jeanes et al. |
| 4,997,462 A | 3/1991 | Nakatani et al. |
| 5,067,970 A | 11/1991 | Wang et al. |
| 5,076,816 A | 12/1991 | Avrillon et al. |
| 5,108,607 A | 4/1992 | Kraus et al. |
| 5,131,928 A | 7/1992 | Blackman et al. |
| 5,141,642 A | 8/1992 | Kusuki et al. |
| 5,181,940 A | 1/1993 | Bikson et al. |
| 5,249,371 A | 10/1993 | Saito et al. |
| 5,290,452 A | 3/1994 | Schucker |
| 5,478,916 A | 12/1995 | Chang et al. |
| 5,500,167 A | 3/1996 | Degen |
| 5,608,014 A | 3/1997 | Ekiner |
| 5,633,039 A | 5/1997 | Avrillon |
| 5,674,629 A | 10/1997 | Avrillon |
| 5,683,584 A | 11/1997 | Wenthold |
| 5,703,176 A | 12/1997 | Ungefug et al. |
| 5,725,633 A | 3/1998 | Ozcayir et al. |
| 5,725,769 A | 3/1998 | Miller et al. |
| 5,753,008 A | 5/1998 | Friesen et al. |
| 5,756,643 A | 5/1998 | Ho et al. |
| 5,762,798 A | 6/1998 | Wenthold |
| 5,882,382 A | 3/1999 | Hachisuka et al. |
| 5,969,087 A | 10/1999 | Maeda |
| 6,387,269 B1 | 5/2002 | Eltner et al. |
| 6,497,747 B1 | 12/2002 | Ding et al. |
| 6,517,725 B2 | 2/2003 | Spearman et al. |
| 6,586,561 B1 | 7/2003 | Litt et al. |
| 6,590,267 B1 | 7/2003 | Goodwin-Johansson et al. |
| 6,623,637 B1 | 9/2003 | Monzen et al. |
| 6,630,064 B1 | 10/2003 | Itatani et al. |
| 6,790,263 B1 | 9/2004 | Ding et al. |
| 7,011,694 B1 | 3/2006 | Ho |
| 7,018,445 B2 | 3/2006 | Simmons et al. |
| 2003/0164090 A1 | 9/2003 | Ding et al. |
| 2007/0180994 A1 | 8/2007 | Cranford et al. |

OTHER PUBLICATIONS

Cranford et al., Journal of Membrane Science, vol. 155, pp. 231-240, 1999.

Huang et al., Journal of Applied Polymer Science, vol. 85, pp. 139-152, 2002.

D.R. Paul et al., Polymeric Gas Separation Membranes, ISBN 0-8493-4415-8, 1994,248-263, CRC Press, Inc.

P. Blanc et al., Synthesis of Hafnia Powders and Nanofiltration Membranes, Journal of the Sol-Gel Science and Technology, 2000, 17, 99-110, 2000 Kluwer Academic Publisher, Manufactured in The Netherlands.

SOLVENT RESISTANT ASYMMETRIC INTEGRALLY SKINNED MEMBRANES

CROSS-REFERENCE TO RELATED APPLICATIONS

The present application is a continuation-in-part of International Patent Application No. PCT/CA2004/001047 filed on Jul. 16, 2004, which claims priority on Canadian Patent Application No. 2,435,538 filed on Jul. 18, 2003. The above-mentioned applications are incorporated herein by reference in their entirety.

TECHNICAL FIELD

The present invention relates to improvements in the field of separation membranes. In particular, this invention relates to solvent resistant asymmetric integrally skinned membranes.

BACKGROUND OF THE INVENTION

The preparation of asymmetric integrally skinned membranes having a defect-free skin is a complicated and tedious task. The presence in the skin layer of pores or defects having a diameter of about 1.0 nm reduces drastically the membrane selectivity. Asymmetric membranes are usually prepared by a phase inversion process as described in U.S. Pat. No. 3,133,132. The permeance or capacity of integrally skinned asymmetric membranes is inversely proportional to the skin thickness when the resistance from the highly porous interior is minimal. Therefore, the skin layer should be as thin as possible, preferably of the order of 100 nm to achieve reasonable permeance or membrane capacity. However, if the skin thickness is reduced, it is more difficult to eliminate the defect pores. Thus, a large proportion of the commercial gas separation membranes used nowadays are composite membranes i.e. they have a thin coating layer applied to an asymmetric support membrane to seal surface pores or defects so as to obtain an adequate selectivity with a suitable capacity. There is still room for improvement in order to produce defect-free integrally skinned membranes.

A forced evaporation method for preparing integrally skinned asymmetric membranes is described in U.S. Pat. No. 4,902,422. In this method, evaporation of a volatile solvent in the casting solution is required at the membrane surface prior to immersion of the nascent membrane into a coagulation bath. This step increases the polymer concentration at the membrane surface and leads to the formation of a defect-free skin. The evaporation period required is long, i.e. 15 to 30 seconds, and limits use in continuous preparation of flat membranes and hollow fibers where the residence time in the air gap is quite short. Another drawback of this method is that it uses volatile organic compounds which have workers health and environmental concerns. Also, since chlorinated hydrocarbons are commonly used as the volatile solvent, water can not be used as the coagulating medium due to mutual immiscibility.

Another method of preparing defect-free asymmetric integrally skinned membranes using common non-volatile solvents is based on a delayed demixing method. For this method, the diffusion induced phase separation, which occurs in the coagulation bath, is delayed. After immersion of a nascent membrane in a non-solvent bath, the outflow of solvent is greater than the inflow of non-solvent and there is a concentration build up at the surface of the membrane. This method was used for the preparation of flat membranes and hollow fibers using a dual-bath coagulation method (J. A. Van't Hof et al., *J. Membrane Sci.* 70, 17-30, 1992). This method can be used with one single bath composed of two immiscible layers or of two separate baths. For the immiscible layers, there are limitations due to penetration of one liquid layer into the other. For the two bath method, there are limitations due to the fact that the membrane is not coagulated prior to leaving the first bath. It is also difficult to transport the membrane to the second bath without damaging it. This method is also limited in view of the insufficient residence time for the dense skin region to form for continuous casting.

U.S. Pat. No. 5,141,642 also describes an asymmetric integrally skinned membrane having a good gas permeability and selectivity. In particular, this patent describes a delayed demixing method for preparing such membranes, which overcomes some of the limitations of the previous method since skin formation and coagulation occur in the same non solvent bath. The details of skin formation are not divulged in this patent. However, it is known that such a method is very sensitive to the coagulation rate as indicated in U.S. Pat. No. 4,460,526. The polymer/solvent/non-solvent system needs to be carefully chosen and coagulation must be carefully controlled. An example is given for a dry-wet hollow fiber spinning method using a polyimide polymer with chlorophenol solvent and coagulating in a 65:35 by weight ethanol/water mixture. Another drawback inherent to this method is that it requires a solvent exchange drying method to prevent collapse of the transition layer below the skin layer. The membrane is first placed in an ethanol bath to completely remove the coagulating liquid and then, it is placed into a hexane bath to extract ethanol prior to being air dried. The latter steps increase the costs and complexity of membrane preparation.

Polyimides can be divided into two main groups: those which can be dissolved by certain organic solvents and those which can not. Asymmetric membranes may be prepared from both groups. The membranes of the first group can be prepared by direct casting. The membranes of the second group are prepared from a polyimide precursor called a polyamic acid which can be dissolved in organic solvents permitting membrane casting. Subsequent to casting, the polyamic acid membrane is converted to a polyimide membrane either by a thermal treatment or a chemical treatment.

U.S. Pat. No. 4,113,628 describes a method for preparing asymmetric integrally skinned membranes from polyamic acid casting solutions. The casting is done in a non-solvent bath which also chemically converts the polyamic acid to a polyimide. The skin is formed by delayed demixing with a slow coagulation rate. These membranes demonstrated a good gas permeation selectivity for $H_2$ over $CH_4$. However, the $H_2$ permeance is low, which indicates that a relatively thick skin is obtained by using such a method. Such a drawback considerably limits the usefulness of these membranes. A method for the preparation of small flat sheet membranes is also described in this patent. Continuous preparation of large membrane quantities using this method is limited by the costs and complexity of regeneration of the non-solvent reaction bath and the usual problems associated with the delayed demixing method.

Cranford et al. in *Journal of Membrane Science* 155, (1999), 231-240 disclose polyetherimide/polyvinylpyrrolidone vapor permeation membranes. These membranes are prepared from a mixture of polyetherimide (PEI) and polyvinylpyrrolidone (PVP) according to a wet-phase inversion technique. The polyetherimide is in fact solubilized in an organic solvent such as N-methylpyrrolidone (NMP). However, the membranes described in this document are not solvent resistant.

Huang et al. in *Journal of Applied Polymer Science* 85, (2002), 139-152 disclose polyimide membranes which can be useful for removal of water from water/organic mixtures. These membranes are prepared by imidizing capillary tubes obtained from a solution including a polyamic acid dissolved in an organic solvent. However, these membranes provided a low selectivity for acetic acid/water. Moreover, the mechanical properties of these membranes were not adequate since the membranes were too brittle and fragile for practical use.

Methods for the preparation of solvent resistant asymmetric microporous membranes are described in U.S. Pat. Nos. 5,725,769 and 5,753,008. The asymmetric membranes prepared according to the latter two patents require a coating layer which provides an adequate selectivity for gas or vapor applications. Unfortunately, such a coating layer increases the cost and renders the production of these membranes more tedious. Also, operational failure may occur due to delamination of the coating layer from the asymmetric support membrane for various reasons such as differences in absorption properties and thermal expansion of the two layers. In many cases, the coating layer limits the range of the operating conditions of the membrane.

Flat dense solvent resistant polyimide membranes prepared from polyamic acids and their salts are described in U.S. Pat. No. 6,497,747. However, the latter patent does not teach or suggest how to prepare asymmetric integrally skinned membranes.

SUMMARY OF THE INVENTION

According to a first aspect of the invention, there is provided an asymmetric integrally skinned membrane comprising a polyimide and another polymer selected from the group consisting of polyvinylpyrrolidone, sulfonated polyetherether ketones, and mixtures thereof, wherein the membrane is substantially insoluble in an organic solvent, and is substantially defect-free.

According to a second aspect of the invention, there is provided an asymmetric integrally skinned membrane comprising:
  a polyimide obtained by curing of a polyamic acid, said polyamic acid being obtained by reacting benzophenone tetracarboxylic dianhydride with a diamine monomer; and
  another polymer selected from the group consisting of polyvinylpyrrolidone, sulfonated polyetheretherketones and mixtures thereof,
  wherein said membrane is substantially insoluble in an organic solvent, and is substantially defect-free.

According to a third aspect of the invention, there is provided an asymmetric integrally skinned membrane comprising:
  a polyimide obtained by curing of a polyamic acid, said polyamic acid being obtained by reacting benzophenone tetracarboxylic dianhydride with a diamine monomer; and
  another polymer selected from the group consisting of polyvinylpyrrolidone, polyetheretherketones, sulfonated polyetheretherketones, sulfonated polyphenyleneoxides, sulfonated polysulfones, sulfonated polyethersulfones, sulfonated polyphenylquinoxalines, and mixtures thereof
  wherein said membrane is substantially insoluble in an organic solvent, and is substantially defect-free.

It was found that the previously mentioned membranes have interesting properties since they are defect-free, solvent resistant, and they are not brittle nor fragile. Moreover, these membranes have excellent separation selectivities. In view of these properties, the membranes of the invention can be used for several industrial applications.

According to a fourth aspect of the invention, there is provided a method of producing an asymmetric integrally skinned polyimide membrane, comprising the steps of:
  a) extruding a casting solution comprising a polyamic acid, and another polymer selected from the group consisting of polyvinylpyrrolidone, sulfonated polyetheretherketones and mixtures thereof, and a first organic solvent through an annulus of a spinneret at a predetermined rate using a bore coagulant comprising water so as to form an asymmetric integrally skinned membrane containing said polyamic acid;
  b) coagulating the asymmetric integrally skinned membrane obtained in step (a) in a water bath having a predetermined temperature;
  c) rinsing the coagulated membrane with water so as to remove said first organic solvent therefrom;
  d) drying the rinsed membrane; and
  e) curing the dried membrane so as to obtain the polyimide membrane,
  whereby the polyimide membrane is substantially insoluble in a second organic solvent, and is substantially defect-free.

According to a fifth aspect of the invention, there is provided a method of producing an asymmetric integrally skinned polyimide membrane, comprising the steps of:
  a) extruding a casting solution comprising a polyamic acid obtained by reacting benzophenone tetracarboxylic dianhydride with a diamine monomer, and a first organic solvent through an annulus of a spinneret at a predetermined rate using a bore coagulant comprising water so as to form an asymmetric integrally skinned membrane containing said polyamic acid;
  b) coagulating the asymmetric integrally skinned membrane obtained in step (a) in a water bath having a predetermined temperature;
  c) rinsing the coagulated membrane with water so as to remove said first organic solvent therefrom;
  d) drying the rinsed membrane; and
  e) curing the dried membrane so as to obtain the polyimide membrane,
  whereby the polyimide membrane is substantially insoluble in a second organic solvent, and is substantially defect-free.

It was found that by using the previously mentioned methods, it is possible to obtain an asymmetric integrally skinned membrane which is substantially defect-free and solvent resistant. These methods permit to obtain membranes which can be used in industrial applications since they are not brittle nor fragile. Moreover, in these methods, the intermediate polyamic acid membranes obtained are rinsed in water. These methods avoid the use of a solvent exchange process which comprises subsequent rinsing with one or more organic solvents in order to prevent pore collapse in the skin layer. In fact, by using these methods it is possible to obtain a thin skin layer on the membranes by rinsing with water, without the need for rinsing with an organic solvent. It was also found that it was possible to use water as a rinsing solvent, without reducing the mechanical properties of the polyamic acid membrane.

The expression "substantially insoluble in an organic solvent" as used herein with respect to the membranes of the invention refers to a membrane which is not dissolved in the organic solvent. Preferably, such a membrane is resistant in the organic solvent for a period of at least 100 hours, more preferably at least 1000 hours. Preferably, the membrane does not lose its properties even after 100 hours, more preferably after 1000 hours of utilization at a temperature of at least 140° C.

In the membranes of the invention, the other polymer is preferably polyvinylpyrrolidone. Similarly, in the methods of the invention, when the other polymer is present, the latter is preferably polyvinylpyrrolidone. The polyvinylpyrrolidone can have an average molecular weight ranging from about 5,000 to about 500,000 g/mol and preferably from about 10,000 to about 100,000 g/mol. An average molecular weight of about 40,000 g/mol is preferred.

The membranes of the invention or prepared according to the methods of the invention can be in the form of a capillary tube (or hollow fiber) having an inner surface and an outer surface. Thus, the membrane can comprise at least one capillary tube. Alternatively, the membranes can comprise a bundle of capillary tubes, each tube having an inner surface and an outer surface. The tube(s) can have an outer diameter greater than 0.4 mm. Preferably, the outer diameter ranges from about 1.0 to about 3.0 mm. The inner diameter of the tube(s) can range from about 0.2 to about 3.5 mm, and preferably from about 0.8 to about 2.5 mm. The tube(s) can also have a wall thickness ranging from about 0.04 to about 0.80 mm, and preferably from about 0.15 to about 0.50 mm.

Furthermore, the tube(s) can have a wall with a density ranging from about 10 to about 60% of the density of a dense film consisting of the polyimide and the other polymer. Preferably, the density of the wall ranges from about 20 to about 40% of the density of the film. The density of the film preferably ranges from about 1.3 to about 1.5 g/cm$^3$. The tube(s) can have a skin layer on the inner surface and/or a skin layer on the outer surface. The skin preferably has a density similar to the density of a corresponding dense film, the density of the film preferably ranges from about 1.3 to about 1.5 g/cm$^3$. The skin is preferably substantially defect-free. The tube(s) can have a wall comprising macrovoids with a diameter of about 0.001 to about 0.01 mm. Preferably, the wall has a lacy structure with pores having a diameter of about 500 nm.

The skin can comprise a first monolayer attached to the surface and a second layer attached to the first monolayer. Preferably, the first layer comprises aggregates of nodules having a thickness ranging from about 70 to about 200 nm. The second layer can have a thickness ranging from about 10 to about 20 nm. Preferably, the second layer comprises fused nodules or a thin polymer matrix. The nodules can have a diameter ranging from about 10 to about 100 nm. The aggregates of nodules can comprise about 5 to 20 fused nodules.

The membranes of the invention or prepared according to the methods of the invention can have a vapor permeance for water of at least $1 \times 10^{-7}$ mol/m$^2$sPa at a temperature of about 30 to about 200° C. Preferably, the vapor permeance for water is greater than $4 \times 10^{-7}$ mol/m$^2$sPa at a temperature of about 80° C. The membranes can have a vapor permeance selectivity of at least 50, preferably at least 250, more preferably at least 260, and even more preferably of at least 290 for water/ethanol or water/ethanol and fusel oil, at a temperature of about 140° C. Alternatively, such a selectivity can be ranging from 250 to 500 and preferably from 300 to 450 for water/ethanol or water/ethanol and fusel oil, at a temperature of about 140° C. The expression "fusel oil" as used herein refers to a mixture of amyl alcohols, propanols and butanols formed from distillation of fermented liquors. The membranes can have a vapor permeance selectivity of at least 50, preferably at least 250, more preferably at least 290, and even more preferably of at least 330 for water/acetic acid, at a temperature of about 85° C. Alternatively, such a selectivity can be ranging from 250 to 500 and preferably from 300 to 450 for water/acetic acid, at a temperature of about 85° C.

The membranes of the invention or prepared according to the methods of the invention can have a vapor permeance selectivity of at least 50, preferably at least 250, and more preferably at least 290 for water/compounds present in wood bark pyrolytic aqueous phase, at a temperature of about 135° C. Alternatively, such a selectivity can be ranging from 250 to 550 and preferably from 300 to 500 for water/compounds present in wood bark pyrolytic aqueous phase, at a temperature of about 135° C. The membranes can have a gas permeance selectivity of at least 5.0 and preferably at least 6.0 for $O_2/N_2$, at a temperature of about 20° C. The membranes can also have, at a temperature of about 50° C., a permeance selectivity of at least 500, preferably at least 1000, more preferably at least 5000, even more preferably at least 10000 for water/natural gas or water/methane. The methane can comprises water vapor. A permeance selectivity of at least 15000 for water/natural gas or water/methane at a temperature of about 50° C. is particularly preferred. The selectivity can also be at least 2500 for water/natural gas or water/methane. The membranes can also have, at a temperature of about 50° C., a permeance selectivity of at least 500, preferably at least 1000, more preferably at least 5000, even more preferably at least 10000, and still even more preferably at least 20000 for water/benzene. A permeance selectivity of at least 30000 for water/benzene at a temperature of about 50° C. is particularly preferred. The membranes can also have, at a temperature of about 50° C., a permeance selectivity of at least 500, preferably at least 1000, more preferably at least 5000, even more preferably at least 10000, and still even more preferably at least 12500 for water/$N_2$. The membranes can also have, at a temperature of about 50° C., a permeance selectivity of at least 500, preferably at least 1000, more preferably at least 2000, even more preferably at least 3000, and still even more preferably at least 3500 for water/$O_2$. The membranes can also have, at a temperature of about 50° C., a permeance selectivity of at least 250, preferably at least 350, more preferably at least 500, even more preferably at least 750, and still even more preferably at least 1000 for water/$CO_2$. A permeance selectivity of at least 1250 for water/$CO_2$ at a temperature of about 50° C. is particularly preferred.

The membranes, when dry, can have a tensile force of at least 1.5 kg/mm$^2$ and preferably of at least 1.8 kg/mm$^2$ at 25° C. The membranes, when saturated with water, can have a tensile force of at least 1.5 kg/mm$^2$ and preferably of at least 1.7 kg/mm$^2$ at 25° C. The membranes, when saturated with ethanol, can have a tensile force of at least 1.0 kg/mm$^2$ and preferably of at least 1.35 kg/mm$^2$ at 25° C. The membrane, when saturated with NMP, can have a tensile force of at least 0.5 kg/mm$^2$ and preferably of at least 0.95 kg/mm$^2$ at 25° C.

The membranes of the invention or prepared according to the methods of the invention can have, when dry, an elongation at break of at least 15%, preferably of at least 30% at 25° C. The membranes, when saturated with water, can have an elongation at break of about 20% at 25° C. The membranes, when saturated with ethanol, can have an elongation at break of about 25% at 25° C. The membranes, when saturated with NMP, can have an elongation at break of about 30% at 25° C. The membranes can be thermally stable at a temperature up to 250° C. and more preferably up to 350° C. The membranes can have a suitable hydrolytic stability so as to prevent chain scission of the polyimide.

The organic solvent in which the membranes of the invention are insoluble can be selected from the group consisting of N-methylpyrrolidone, dimethylacetamide, dimethylformamide, dimethylsulfoxide, $C_1$-$C_6$ alcohols and preferably methanol, ethanol, propanol, or butanol, $C_1$-$C_6$ carboxylic acids and preferably formic acid, acetic acid, propionic acid or butyric acid, $C_1$-$C_7$ aldehydes and preferably formaldehyde or furfural, $C_3$-$C_8$ ketones and preferably acetone, propanone or butanone, $C_6$-$C_8$ phenols and preferably cresol or guaiacol, $C_3$-$C_{10}$ esters and preferably methyl acetate or methyl propionate, $C_5$-$C_{12}$ alkanes and preferably octane, $C_1$-$C_4$ amines and preferably methyl amine, $C_2$-$C_6$ amides and preferably acetamide, and mixtures thereof. N-methylpyrrolidone, dimethylacetamide, dimethylformamide, and dimethylsulfoxide are particularly preferred. N-methylpyrrolidone is the preferred solvent.

In the membrane according to the first aspect of the invention, the polyimide can be obtained by curing a polyamic acid. The polyamic acid, on the other hand, can be obtained by reacting a dianhydride monomer with a diamine monomer. The polyamic acid used in the method according to the fourth aspect of the invention can be prepared by reacting together a dianhydride monomer with a diamine monomer.

In the membranes or methods of the invention, when the polyimide is obtained from curing of a polyamic acid prepared by reacting a diamine monomer with a dianhydride monomer, the latter can be selected from the group consisting of benzophenone tetracarboxylic dianhydride (BTDA), pyromellitic dianhydride (PMDA), biphenyl tetracarboxylic dianhydride (BPDA), dicarboxyphenyl hexafluoropropane dianhydride (6FDA), diphenylsulfone tetracarboxylic dianhydride (DSDA), oxydiphthalic anhydride (ODPA) and mixtures thereof. Preferably, the dianhydride monomer is selected from the group consisting of benzophenone tetracarboxylic dianhydride, pyromellitic dianhydride and mixtures thereof. More preferably, the dianhydride monomer is benzophenone tetracarboxylic dianhydride. The diamine monomer can be selected from the group consisting of oxydianiline (ODA), diaminodiphenyl sulfone (DDS), bis(aminophenyl) hexafluoropropane (Bis-A-AF), bis(4-[4-aminophenoxy] phenyl)sulfone (BAPS), bis(aminophenoxy)benzene (TPE) and mixtures thereof. Preferably, the diamine monomer is selected from the group consisting of oxydianiline, diaminodiphenyl sulfone, bis(aminophenoxy)benzene, and mixtures thereof. Examples of preferred combinations of dianhydride monomer/diamine monomer are: benzophenone tetracarboxylic dianhydride/oxydianiline; pyromellitic dianhydride/bis(aminophenoxy)benzene; pyromellitic dianhydride/oxydianiline; and benzophenone tetracarboxylic dianhydride/diaminodiphenyl sulfone.

In the methods of the invention, the first organic solvent can be selected from the group consisting of N-methylpyrrolidone, dimethylacetamide, dimethylformamide, dimethylsulfoxide and mixtures thereof. Preferably, the organic solvent is selected from the group consisting of N-methylpyrrolidone, dimethylacetamide and mixtures thereof. N-methylpyrrolidone is preferred. The first organic solvent can be present in the solution in an amount ranging from about 50 to about 90% by weight, based on the total weight of the solution. Preferably, the amount of organic solvent ranges from 60 to 80 wt. % and more preferably from 65 to 75 wt. %. In these methods, the polyamic acid can be present in the solution in an amount ranging from about 8 to about 30% by weight, based on the total weight of the solution. Preferably, the amount of polyamic acid ranges from about 10 to about 25% and more preferably from about 12 to about 20%.

In the methods of the invention, when the membrane is spun, the predetermined rate can range from about 1 to about 100 cm/s and preferably from about 6 to about 14 cm/s. Preferably, use is made of a bore coagulant having a flow rate ranging from about 1 to about 100 mL/minute, and more preferably from about 6 to about 18 mL/minute. The bore coagulant can be at a temperature of 0 to 80° C. and preferably at about 20° C. The preferred bore coagulant consists of water. The membrane is preferably coagulated in a water bath having a predetermined temperature ranging from about 0 to about 80° C. Preferably, the predetermined temperature of the bath ranges from about 20 to about 40° C. Alternatively, the water bath can be at room temperature.

In step (c) of the previously mentioned methods, the membrane can be rinsed and soaked in water for a period of at least 0.1 hour, preferably at least 0.5 hour, more preferably at least 1.0 hour and even more preferably for at least 4.0 hours. The temperature of the water in step (c) can be of about 0 to about 50° C., preferably of about 15 to about 25° C., and more preferably of about 20° C. Alternatively, the water can be at room temperature. Advantageously, the interior and the exterior of the membrane is rinsed with water. Moreover, the membrane is preferably drained prior to drying. In step (c), the organic solvent can be recovered. Step (e) can be carried out by disposing the membrane in an oven, heating the membrane and purging the membrane with an inert gas. Preferably, the membrane is heated gradually until a temperature of about 250° C. to about 400° C. is reached. More preferably, the membrane is heated by:
i) heating the membrane at a rate ranging from about 0.5 to about 2° C./min from room temperature up to a temperature ranging from about 80° C. to about 160° C.;
ii) further heating the membrane at a constant temperature ranging from about 80 to about 160° C. for a period of time ranging from about 0.5 to about 2 hours;
iii) further heating the membrane at a rate ranging from about 0.5 to about 20° C./min until a temperature of about 250° C. to about 300° C. is reached;
iv) further heating the membrane at a constant temperature ranging from about 250° C. to about 300° C. for a period ranging from about 0.5 to about 4 hours; and
v) cooling the membrane to room temperature over a period ranging from about 0.5 hour to about 8 hours.

In the methods of the invention, the casting solution can also contain a non-solvent. Preferably, the non-solvent is present in the solution in an amount ranging from about 0 to about 30.0% by weight, based on the total weight of the solution. An amount of non-solvent ranging from about 15 to about 20% is preferred. Preferably, the non-solvent is selected from the group consisting of ethylene glycol, ethanol, glycerol, water, methanol, acetic acid, propionic acid and mixtures thereof. Glycerol is most preferred.

The second organic solvent used in the methods of the invention can be selected from the group consisting of N-methylpyrrolidone, dimethylacetamide, dimethylformamide, dimethylsulfoxide, $C_1$-$C_6$ alcohols and preferably methanol, ethanol, propanol, or butanol, $C_1$-$C_6$ carboxylic acids and preferably formic acid, acetic acid, propionic acid or butyric acid, $C_1$-$C_7$ aldehydes and preferably formaldehyde or furfural, $C_3$-$C_8$ ketones and preferably acetone, propanone or butanone, $C_6$-$C_8$ phenols and preferably cresol or guaiacol, $C_3$-$C_{10}$ esters and preferably methyl acetate or methyl propionate, $C_5$-$C_{12}$ alkanes and preferably octane, $C_1$-$C_4$ amines and preferably methyl amine, $C_2$-$C_6$ amides and preferably acetamide, and mixtures thereof.

In the method according to the fifth aspect of the invention, the casting solution can further contain another polymer selected from the group consisting of polyvinylpyrrolidone, polyetheretherketones, sulfonated polyetheretherketones, sulfonated polyphenyleneoxides, sulfonated polysulfones, sulfonated polyethersulfones, sulfonated polyphenylquinoxalines and mixtures thereof. The other polymer can be present in the solution in an amount ranging from about 0.1 to about 60.0% and preferably from 0.5 to about 25.0% by weight, based on the total weight of the solution. An amount ranging from 1.0 to about 2.0% is preferred. Preferably, the other polymer is polyvinylpyrrolidone.

The membranes of the invention or prepared according to the methods of the invention are useful for dehydrating a solution comprising water and an organic compound. Some examples although not limiting are the organic compounds selected from the group consisting of organic acids such as acetic acid, alcohols such as ethanol or propanol, ethyl acetate, complex mixtures such as pyrolytic aqueous phases containing hundreds of organic compounds, and mixtures thereof. Preferably, the organic solvent is acetic acid or ethanol. The solution can comprise 1 to 99% and preferably 10 to 96% by weight of water, based on the total weight of the solution. The solution can comprise 1 to 99% and preferably 4 to 90% by weight of the organic solvent, based on the total weight of the solution.

The membranes of the invention or prepared according to the methods of the invention can also be used for concentrating a solution comprising an organic compound and water, recovering an organic compound from an aqueous vapor stream, water treatment, increasing a chemical reaction driving force by removing water vapor from a vessel wherein the reaction is carried out, reducing organic compound emissions, reducing energy consumption, or improving performance of wood driers. They can also be useful in a Fischer-Tropsch process or a process for the production of synthesis gas. The membranes of the present invention can also be used as water-gas separators operable for at least partially removing water from natural gas or methane gas. Finally, they can be used for removing water from a composition comprising water and various organic compounds such as methanol, ethanol, propanol, acetic acid, ethyl acetate, phenols, bezene, toluene, ethylbenzene, xylene, formaldehyde, formic acid, NMP, acetone, light and heavy hydrocarbons, or mixtures thereof, or for removing water from a composition comprising water and a gas such as $N_2$, $O_2$, $CO_2$, CO, light hydrocarbons (preferably such as $C_1$-$C_4$ hydrocarbons), or mixtures thereof etc.

In accordance with another aspect of the invention there is provided a method for concentrating a composition comprising water and an organic compound or comprising water and a gas. The method comprises the step of contacting the composition with a membrane as defined in the present invention (preferably passing the composition through a membrane comprising at least one capillary tube) so as to at least partially remove water from the composition, thereby concentrating the composition i.e. increasing the composition of the organic compound or of the gas. Such a concentrating step is possible in view of the vapor permeance for water of the membrane and its selectivity water/organic compound or water/gas. This method can thus permit to considerably concentrate the organic compound that can be, without limitation, methanol, ethanol, propanol, acetic acid, ethyl acetate, phenols, benzene, toluene, ethylbenzene, xylene, formaldehyde, formic acid, NMP, acetone, light and heavy hydrocarbons, or mixtures thereof etc or the gas that can be $N_2$, $O_2$, $CO_2$, CO, light hydrocarbons (preferably such as $C_1$-$C_4$ hydrocarbons), or mixtures thereof etc.

In accordance with another aspect of the invention there is provided a method for concentrating a composition comprising water and natural gas (can comprise methane as major component and optionally other hydrocarbons). The method comprises the step of contacting the composition through a membrane as defined in the present invention (preferably passing the composition through a membrane comprising at least one capillary tube) so as to at least partially remove water from the composition, thereby concentrating the composition i.e. increasing the concentration of natural gas. Then, the obtained composition can also be further treated with another membrane as defined in the present invention so as to at least partially remove $H_2S$ from the composition i.e. in order to further purity the natural gas. It can also be possible to pass the composition into another membrane of the present invention so as to at least partially remove $CO_2$ from the composition and further purify the natural gas. The person skilled in the art would understand that different membranes can be selected so as to specifically remove undesirable impurities. The person skilled in the art would thus be able, without undue experimentation, to select the appropriate membrane for removing a particular impurity.

Methods of water treatment, increasing a chemical reaction driving force by removing water vapor from a vessel wherein the reaction is carried out, reducing organic compound emissions, reducing energy consumption, or improving performance of wood driers can also be carried out by contacting a composition with the membranes of the present invention. Methods for the production of synthesis gas can also be carried out in a similar way.

BRIEF DESCRIPTION OF THE DRAWINGS

Further features and advantages of the invention will become more readily apparent from the following description of preferred embodiments as illustrated by way of examples in the appended drawings wherein.

DESCRIPTION OF PREFERRED EMBODIMENTS

The present invention will be more readily understood with reference to the following non-limiting examples.

Figure 1:
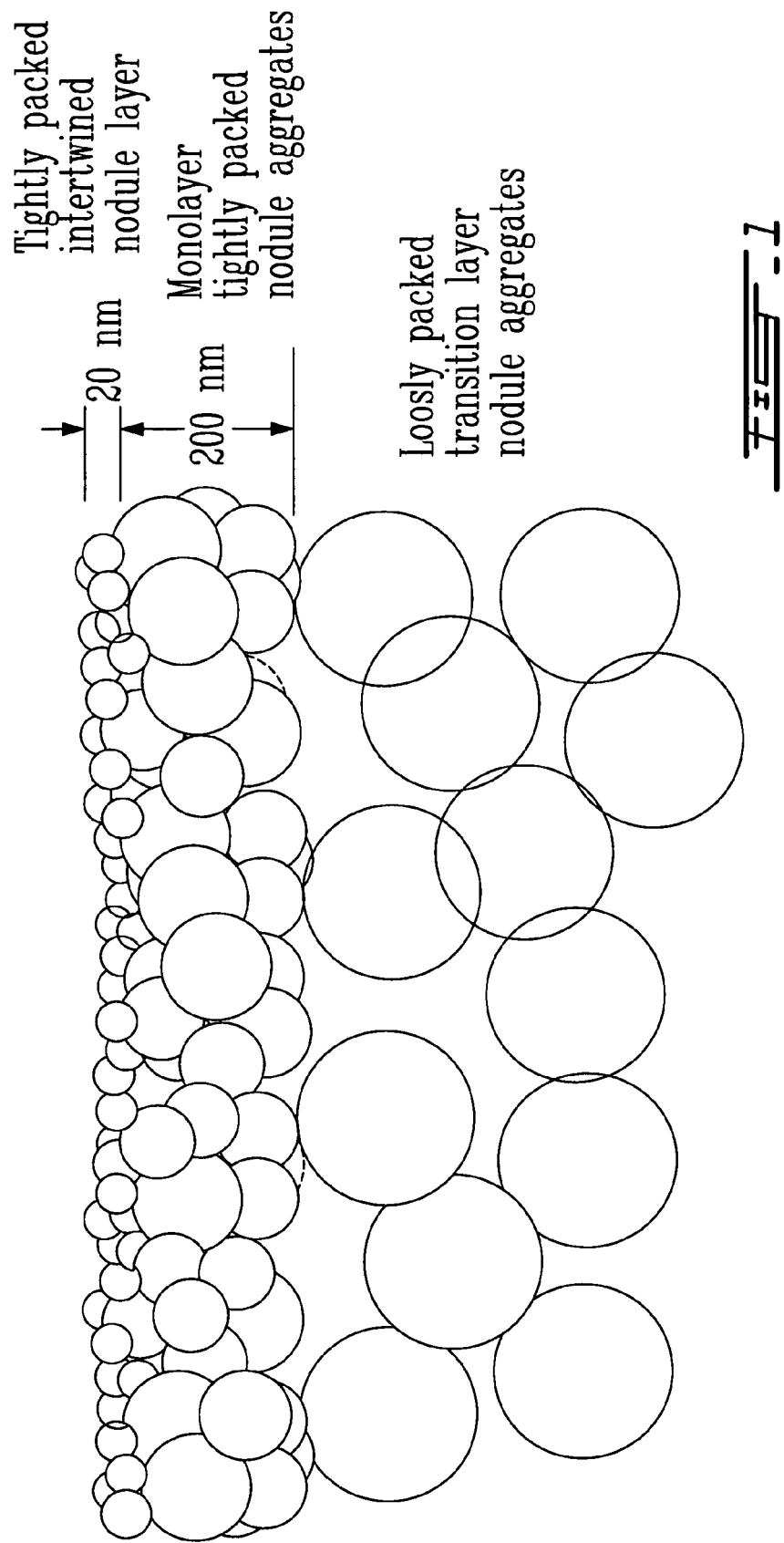
FIG. 1 is a schematic sectional view of a membrane according to a preferred embodiment of the invention.
Figure 2:
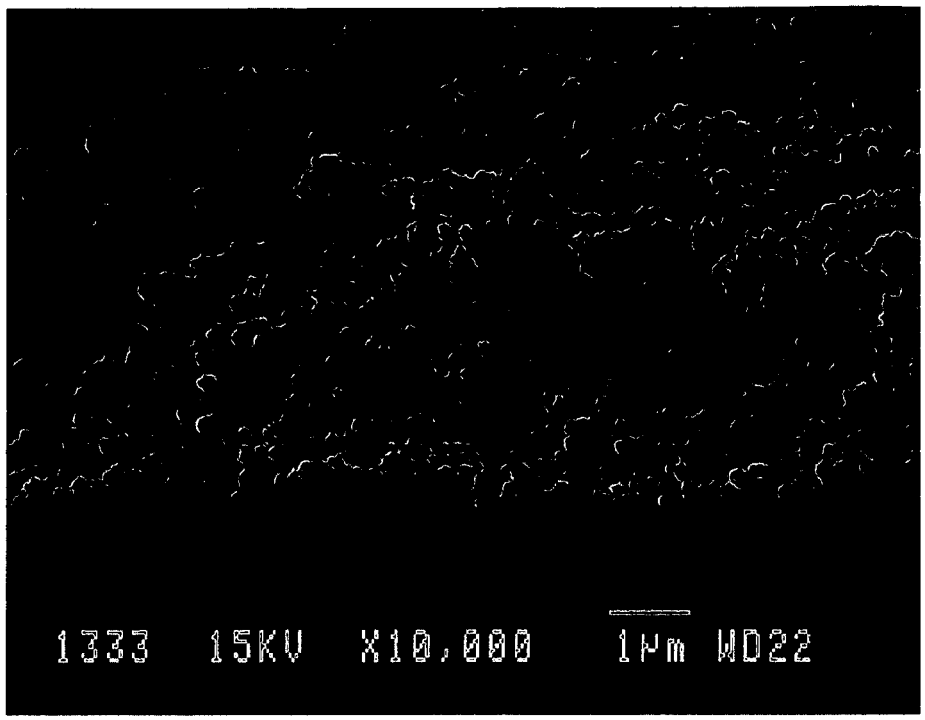
FIG. 2 is a SEM picture (Scanning Electron Microscope) of a membrane according to another preferred embodiment of the invention.
Figure 3:
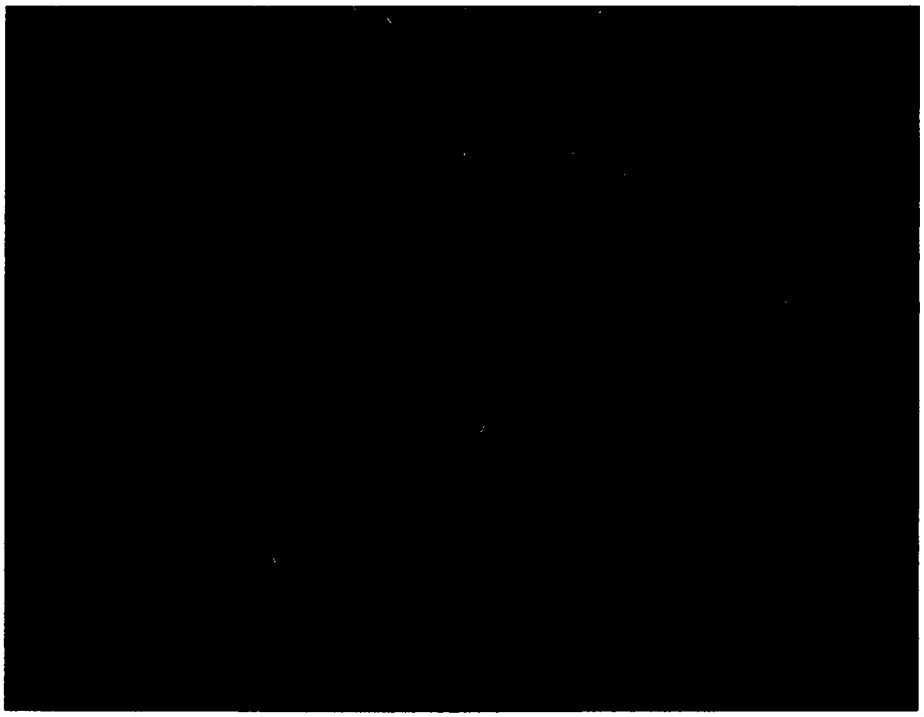
FIG. 3 is a SEM picture (Scanning Electron Microscope) of a membrane according to still another preferred embodiment of the invention.
Figure 4:
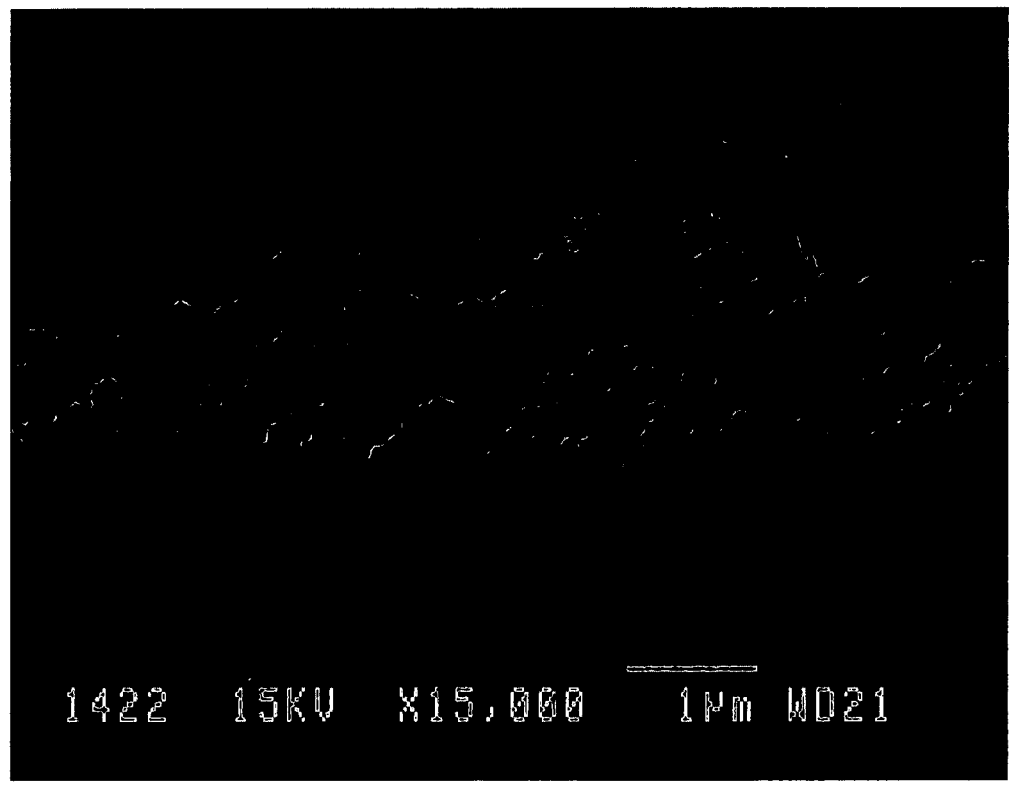
FIG. 4 is a SEM picture (Scanning Electron Microscope) of a membrane according to yet another preferred embodiment of the invention.

As illustrated in FIG. 1, the skin layer is composed of a monolayer of nodule aggregates with a thickness of 70-200 nm. A dense layer with a thickness of 10-20 nm covers the monolayer of nodule aggregates. This dense layer may be composed of fused nodules or a thin dense polymer matrix. This layer and the nodules are dense and have permeability properties essentially the same as dense films of the polymer material of which they are composed. The nodules have diameter of 10-100 nm. Nodule aggregates are composed of 5-20 fused nodules. The basic building unit of the membrane is nodule aggregates. The highly porous interior of the membrane may have a three dimensional web like structure. The nodule aggregates are fused linearly together to form the threading for the web like structure. The region below the skin layer may be a loosely packed region of nodule aggregates. The nodule aggregates of region below the skin layer are partially fused together. The membrane interior may be composed of macrovoids with 0.01 mm diameter and a lacy structure with pore diameter of 500 nm.

EXAMPLES

The following examples describe how to prepare the polyamic acid casting solutions, the capillary tubes and the membranes of the invention.

Casting Solutions

Casting Solution A

A 19% by weight solution of a polyamic acid (PM) was prepared from 4,4'-diaminodiphenyl ether (ODA) and benzophenone tetracarboxylic dianhydride (BTDA) in N-methylpyrrolidone (NMP) solvent. A solution containing 50% by weight of polyvinylpyrrolidone (PVP) in NMP was added to the PM solution. Then glycerol and NMP were added to the solution. The final solution had a composition of PAA/PVP/GLY/NMP of 13/1/17/69 by weight. The solution was mixed for a period of about 12 hours prior to casting.

Casting Solution B

This solution was prepared according to the same protocole as mentioned above for the casting solution A with the exception that the proportions were different in order to provide a final composition having a PAA/PVP/GLY/NMP composition of 12/1/20/67 by weight.

Casting Solution C

A 20% by weight solution of a polyamic acid (PM) was prepared from 4,4'-diaminodiphenyl ether (ODA) and benzophenone tetracarboxylic dianhydride (BTDA) in N-methylpyrrolidone (NMP) solvent.

Casting Solution D

A 22% by weight solution of a polyamic acid (PM) was prepared from 4,4'-diaminodiphenyl ether (ODA) and benzophenone tetracarboxylic dianhydride (BTDA) in N-methylpyrrolidone (NMP) solvent. A 19% by weight solution of SPEEK, a particular sulfonated polyetheretherketone, was prepared in NMP solvent. The two solutions and water were mixed together to provide a final homogeneous solution with the following composition PAA/SPEEK/$H_2O$/NMP 16.0/3.9/5.9/74.2 by weight.

Casting Solution E

A 20% by weight solution of a polyamic acid (PM) was prepared from 4,4'-diaminodiphenyl ether (ODA) and benzophenone tetracarboxylic dianhydride (BTDA) in N-methylpyrrolidone (NMP) solvent. A 25% by weight solution of SPEEK was prepared in NMP solvent. The two solutions were mixed together to provide a final homogeneous solution with the following composition PAA/SPEEK/NMP 4.9/18.6/76.5 by weight.

Casting Solution F

A 25% by weight solution of SPEEK was prepared in N-methylpyrrolidone (NMP) solvent. After mixing for a period of about 48 hours, a homogeneous transparent solution was obtained.

Casting Solution G

A 20% by weight solution of a polyamic acid (PM) was prepared from 4,4'-diaminodiphenyl ether (ODA) and benzophenone tetracarboxylic dianhydride (BTDA) in N-methylpyrrolidone (NMP) solvent. SPEEK polymer was neutralized in a NaOH solution to replace the hydrogen ion with a sodium ion. The neutralised polymer (SPEEK-Na+) was placed in an oven at 60° C. until dried. It was then dissolved in NMP to form a 15% by weight solution of SPEEK-Na+. This solution was mixed with the PM solution and NMP to provide a final homogeneous solution with the following composition PAA/SPEEK-Na+/NMP 7.8/7.5/84.7 by weight.

Casting Solution H

This solution was prepared according to the same protocole as mentioned above for the casting solution A with the exception that the proportions were different in order to provide a final composition having a PAA/PVP/GLY/NMP composition of 15/1/16/68 by weight.

Casting Solution I

A 22% by weight solution of a polyamic acid (PM) was prepared from 4,4'-diaminodiphenyl ether (ODA) and benzophenone tetracarboxylic dianhydride (BTDA) in N-methylpyrrolidone (NMP) solvent. A 19% by weight solution of SPEEK was prepared in NMP solvent. The two solutions and water were mixed together to provide a final homogeneous solution with the following composition PAA/SPEEK/H2O/NMP 16/1/5/78 by weight.

Casting Solution J

A 20% by weight solution of a polyamic acid (PM) was prepared from pyromellitic dianhydride (PMDA) and oxydianiline (ODA) and diaminodiphenyl sulfone (DDS) in N-methylpyrrolidone (NMP) solvent. The molar ratios of PMDA:ODA:DDS were 1.005:0.8:0.2. A solution containing 50% by weight of polyvinylpyrrolidone (PVP) in NMP was added to the PM solution. Then, glycerol and NMP were added to the solution. The final solution had a composition of PAA/PVP/GLY/NMP of 16/2/18/64 by weight. The solution was mixed for a period of 12 hours prior to casting.

Casting Solution K

A 18% by weight solution of a polyamic acid (PM) was prepared from biphenyl tetracarboxylic dianhydride (BPDA) and oxydianiline (ODA) in N-methylpyrrolidone (NMP) solvent. A solution containing 50% by weight of polyvinylpyrrolidone (PVP) in NMP was added to the PM solution. Then, glycerol and NMP were added to the solution. The final solution had a composition of PAA/PVP/GLY/NMP of 13/1/13/73 by weight. The solution was mixed for a period of about 12 hours prior to casting.

Casting Solution L

A 24% by weight solution of a polyamic acid (PM) was prepared from pyromellitic dianhydride (PMDA) and 1,3-bis (4-aminophenoxy)benzene (TPE-R) in N-methylpyrrolidone (NMP) solvent. A solution containing 50% by weight of polyvinylpyrrolidone (PVP) in NMP was added to the PM solution. Then, glycerol and NMP were added to the solution. The final solution had a composition of PAA/PVP/GLY/NMP of 21/2/14/63 by weight. The solution was mixed for a period of 12 hours.

Casting Solution M

A 21% by weight solution of a polyamic acid (PM) was prepared from 4,4'-diaminodiphenyl ether (ODA) and pyromellitic dianhydride (PMDA) in N-methylpyrrolidone (NMP) solvent. Then glycerol was added to the solution. The final solution had a composition of PAA/GLY/NMP of 17/20/63 by weight. The solution was mixed for a period of 12 hours.

Casting Solution N

The casting solution was prepared according to the procedure for casting solution A with the exception that the proportions were different in order to provide a final composition having a PAA/PVP/GLY/NMP composition of 17/1/16/68 by weight.

Casting Solution O

The casting solution was prepared according to the procedure described for casting solution A, with the exception that the proportions were different in order to provide a final composition having a PAA/PVP/GLY/NMP composition of 15/1/17/67 by weight.

Casting Solution P

The casting solution was prepared according to the procedure described for casting solution A, with the exception that the proportions were different in order to provide a final composition having a PAA/PVP/GLY/NMP composition of 16/1/17/66 by weight.

Capillary Tubes

The following capillary tubes have been prepared with the above-mentioned casting solutions. It should be noted that the capillary tubes of the invention taken alone can be considered as membranes. In other cases, several capillary tubes are joined together so as to form a membrane (see membranes A, B, and H to N).

Capillary Tube A

Casting solution A was extruded through a tube-in-orifice spinneret using a solution of 100% water at 20° C. as the internal coagulant. The flow rate of the internal coagulant was controlled at 12 ml/min. The capillary tube was spun at a rate of 4 cm/s with a residence time in the air gap of 6 s. The membrane was coagulated in a 100% water bath at 30° C. The membrane was then rinsed with water at room temperature for 2 to 4 hours, until the extraction of residual solvent and glycerol was substantially complete. The membrane was then air dried. The membrane was then imidized by placing the capillary tube in an oven with a nitrogen purge. The temperature cycle was the following: Gradual heating to 150° C. over a period of 3 h, 150° C. for 1 h, gradual heating to 250° C. over a period of 2 h, 1 hour at 250° C., gradual cooling to room temperature over a period of 4 h. The resulting polyimide/PVP membrane had an external diameter of 2.2 mm and a wall thickness of 0.3 mm.

Capillary Tube B

Casting solution B was extruded through a tube-in-orifice spinneret using a solution of 100% water at 20° C. as the internal coagulant. The flow rate of the internal coagulant was controlled at 14 ml/min. The capillary tube was spun at a rate of 6 cm/s with a residence time in the air gap of 3 s. The membrane was coagulated in a 100% water bath at 30° C. The membrane was then rinsed with water at room temperature for 2 to 4 hours, until extraction of residual solvent and glycerol was substantially complete. The membrane was then air dried. The membrane was then imidized by placing the capillary tube in an oven with a nitrogen purge. The temperature cycle was the following: Gradual heating to 150° C. over a period of 3 h, 150° C. for 1 h, gradual heating to 250° C. over a period of 2 h, 1 hour at 250° C., gradual cooling to room temperature over a period of 4 h. The resulting polyimide/PVP membrane had an external diameter of 2.4 mm and a wall thickness of 0.4 mm.

Capillary Tube C

Casting solution H was extruded through a tube-in-orifice spinneret using a solution of 100% water at 20° C. as the internal coagulant. The flow rate of the internal coagulant was controlled at 10 ml/min. The capillary tube was spun at a rate of 4 cm/s with a residence time in the air gap of 7 s. The membrane was coagulated in a 100% water bath at 30° C. The membrane was then rinsed with water at room temperature for 2 to 4 hours, until extraction of residual solvent and glycerol was substantially complete. The membrane was then air dried. The membrane was then imidized by placing the capillary tube in an oven with a nitrogen purge. The temperature cycle was the following: Gradual heating to 150° C. over a period of 3 h, 150° C. for 1 h, gradual heating to 250° C. over a period of 2 h, 1 hour at 250° C., gradual cooling to room temperature over a period of 4 h. The resulting polyimide/PVP membrane had an external diameter of 2.1 mm and a wall thickness of 0.4 mm.

Capillary Tube D

Casting solution I was extruded through a tube-in-orifice spinneret using a solution of 100% water at 20° C. as the internal coagulant. The flow rate of the internal coagulant was controlled at 7 ml/min. The capillary tube was spun at a rate of 6 cm/s with a residence time in the air gap of 3 s. The membrane was coagulated in a 100% water bath at 40° C. The membrane was then rinsed with water at room temperature for 2 to 4 hours, until extraction of residual solvent and glycerol was substantially complete. The membrane was then air dried. The membrane was then imidized by placing the capillary tube in an oven with a nitrogen purge. The temperature cycle was the following: Gradual heating to 150° C. over a period of 3 h, 150° C. for 1 h, gradual heating to 250° C. over a period of 2 h, 1 hour at 250° C., gradual cooling to room temperature over a period of 4 h. The resulting polyimide/SPEEK membrane had an external diameter of 2.0 mm and a wall thickness of 0.3 mm.

Capillary Tube E

Casting solution J was extruded through a tube-in-orifice spinneret using a solution of 75% water and 25% glycerol by weight at 20° C. as the internal coagulant. The flow rate of the internal coagulant was controlled at 12 ml/min. The capillary tube was spun at a rate of 4 cm/s with a residence time in the air gap of 7 s. The membrane was coagulated in a 100% water bath at 19° C. The membrane was then rinsed with water at room temperature for 2 to 4 hours, until extraction of residual solvent and glycerol was substantially complete. The membrane was then air dried. The membrane was then imidized by placing the capillary tube in an oven with a nitrogen purge. The temperature cycle was the following: Gradual heating to 150° C. over a period of 3 h, 150° C. for 1 h, gradual heating to 385° C. over a period of 2 h, 1 hour at 385° C., gradual cooling to room temperature over a period of 4 h. The resulting polyimide/PVP membrane had an external diameter of 1.8 mm and a wall thickness of 0.2 mm.

Capillary Tube F

Casting solution K was extruded through a tube-in-orifice spinneret using a solution of 100% water at 20° C. as the internal coagulant. The flow rate of the internal coagulant was controlled at 18 ml/min. The capillary tube was spun at a rate of 4 cm/s with a residence time in the air gap of 7 s. The membrane was coagulated in a 100% water bath at 20° C. The membrane was then rinsed with water at room temperature for 2 to 4 hours, until extraction of residual solvent and glycerol was substantially complete. The membrane was then air dried. The membrane was then imidized by placing the capillary tube in an oven with a nitrogen purge. The temperature cycle was the following: Gradual heating to 150° C. over a period of 3 h, 150° C. for 1 h, gradual heating to 250° C. over a period of 2 h, 1 hour at 250° C., gradual cooling to room temperature over a period of 4 h. The resulting polyimide/PVP membrane had an external diameter of 2.0 mm and a wall thickness of 0.2 mm.

Capillary Tube G

Casting solution L was extruded through a tube-in-orifice spinneret using a solution of 100% water at 20° C. as the internal coagulant. The flow rate of the internal coagulant was controlled at 6 ml/min. The capillary tube was spun at a rate of 5 cm/s with a residence time in the air gap of 13 s. The membrane was coagulated in a 100% water bath at 20° C. The membrane was then rinsed with water at room temperature for 2 to 4 hours, until extraction of residual solvent and glycerol was substantially complete. The membrane was then air dried. The membrane was then imidized by placing the capillary tube in an oven with a nitrogen purge. The temperature cycle was the following: Gradual heating to 150° C. over a period of 3 h, 150° C. for 1 h, gradual heating to 250° C. over a period of 2 h, 1 hour at 250° C., gradual cooling to room temperature over a period of 4 h. The resulting polyimide/PVP membrane had an external diameter of 1.5 mm and a wall thickness of 0.3 mm.

Capillary Tube H

Casting solution M was extruded through a tube-in-orifice spinneret using a solution of 100% water at 20° C. as the internal coagulant. The flow rate of the internal coagulant was controlled at 9 ml/min. The capillary tube was spun at a rate of 5 cm/s with a residence time in the air gap of 6 s. The membrane was coagulated in a 100% water bath at 20° C. The membrane was then rinsed with water at room temperature for 2 to 4 hours, until extraction of residual solvent and glycerol was substantially complete. The membrane was then air dried. The membrane was then imidized by placing the capillary tube in an oven with a nitrogen purge. The temperature cycle was the following: Gradual heating to 150° C. over a period of 3 h, 150° C. for 1 h, gradual heating to 310° C. over a period of 2 h, 1 hour at 310° C., gradual cooling to room temperature over a period of 4 h. The resulting polyimide membrane had an external diameter of 1.9 mm and a wall thickness of 0.25 mm.

Capillary Tube I

The capillary tube was prepared according to the procedure for capillary tube A, with the exception that casting solution N was used instead of casting solution A. The capillary tube I had an external diameter of 2.0 mm, and a wall thickness of 0.21 mm.

Capillary Tube J

The capillary tube J was prepared according to the procedure for capillary tube A with the following exceptions. The casting solution used was casting solution O and the spinning temperature was 35° C. The internal coagulant flow rate was controlled at 8 ml/min. The capillary tube spinning velocity was 7.0 cm/s. The residence time in the air gap was 4 s. The capillary tube J had an external diameter of 1.60 mm and a wall thickness of 0.28 mm.

Capillary Tube K

Casting solution P was extruded through a tube-in-orifice spinneret using a solution of 100% water at 35° C. as the internal coagulant. The flow rate of the internal coagulant was controlled at 10 ml/min. The capillary tube was spun at a rate of 3 cm/s with a residence time in the air gap of 30 s. The membrane was coagulated in a 100% water bath at 20° C. The membrane was then rinsed with water at room temperature for 2 to 4 hours, until the extraction of residual solvent and glycerol was substantially complete. The membrane was then air dried. The membrane was then imidized by placing the capillary tube in an oven with a nitrogen purge. The temperature cycle was the following: gradual heating to 150° C. over a period of 3 h, 150° C. for 1 h, gradual heating to 250° C. over a period of 2 h, 1 hour at 250° C., and gradual cooling to room temperature over a period of 4 h. The membrane was recured in a nitrogen atmosphere for one hour at 295° C. The resulting polyimide/PVP membrane had an external diameter of 1.36 mm and a wall thickness of 0.26 mm.

Membranes

The following membranes have been prepared with the above-mentioned capillary tubes and casting solutions. Table 1 resumes the composition of the membranes and capillary tubes.

Membrane A

A bundle of 31 capillary tubes A were potted together with an epoxy resin to form a capillary tube bundle 1.4 m long with a membrane surface area of 0.26 m$^2$.

Membrane B

A bundle of 58 capillary tubes B were potted together with an epoxy resin to form a capillary tube bundle 1.1 m long with a membrane surface area of 0.40 m$^2$.

Membranes C, D, E, F, and G

Casting solutions C, D, E, F and G, respectively, were spun-cast onto glass plates to provide membranes C, D, E, F and G. The dense membranes on the glass plates were dried at 60° C. overnight under air. Then they were placed in an oven with a N$_2$ purge gas. The temperature cycle was the following: Gradual heating to 150° C. over a period of 3 h, 150° C. for 1 h, gradual heating to 250° C. over a period of 2 h, 1 hour at 250° C., gradual cooling to room temperature over a period of 4 h. The membrane was removed from the glass plate by soaking in a water bath. The thickness of the dry dense membranes varied from 0.022 to 0.035 mm.

Membrane H

A bundle of 5 capillary tubes C were potted together with an epoxy resin to form a capillary tube bundle 23 cm long with a membrane surface area of 61 cm$^2$.

Membrane I

A bundle of 35 capillary tubes D were potted together with an epoxy resin to form a capillary tube bundle 1.3 m long with a membrane surface area of 0.25 m$^2$.

Membrane J

A bundle of 9 capillary tubes E were potted together with an epoxy resin to form a capillary tube bundle 21 cm long with a membrane surface area of 98 cm$^2$.

Membrane K

A bundle of 20 capillary tubes F were potted together with an epoxy resin to form a capillary tube bundle 20 cm long with a membrane surface area of 66 cm$^2$.

Membrane L

A bundle of 10 capillary tubes G were potted together with an epoxy resin to form a capillary tube bundle 19 cm long with a membrane surface area of 71 cm$^2$.

Membrane M

A bundle of 7 capillary tubes H were potted together with an epoxy resin to form a capillary tube bundle 21.5 cm long with a membrane surface area of 74 cm$^2$.

Membrane N

The membrane N was prepared from a bundle of 52 capillary tubes I, which were potted together to form a capillary tube bundle 1.52 m long with a membranes surface area of 0.43 m$^2$.

Membrane O

The membrane O was prepared from a bundle of 24 capillary tubes K, which were potted together to form a capillary tube bundle 170 mm long with a membrane surface area of 109 cm$^2$.

TABLE 1

| Membranes | Capillary Tubes | Casting Solutions |
|---|---|---|
| A | A | A |
| B | B | B |
| C | — | C |
| D | — | D |
| E | — | E |
| F | — | F |
| G | — | G |
| H | C | H |
| I | D | I |
| J | E | J |
| K | F | K |
| L | G | L |
| M | H | M |

TABLE 1-continued

| Membranes | Capillary Tubes | Casting Solutions |
|---|---|---|
| N | I | N |
| — | J | O |
| O | K | P |

Experiments

The following experiments have been carried out by using the above-mentioned membranes and capillary tubes.

Experiment 1

Membrane A was then tested with a vaporous feed stream of 22 wt % water, 68 wt % ethanol and 10 wt % fusel oil at 140° C. Feed was to the bore side of the capillary tube. The permeate pressure was maintained at 4.5 kPa by a vacuum pump downstream of a water cooled permeate condenser. The feed pressure was maintained at 200 kPa and there was negligible pressure drop across the membrane module. The results are given in Tables 2 and 3.

Experiment 2

Membrane B was then tested with a vaporous feed stream of 95 wt % water and 5 wt % acetic acid at 95° C. Feed was to the bore side of the capillary tube. The permeate pressure was maintained at 7.5 kPa by a vacuum pump downstream of water cooled condenser. The feed pressure was maintained at 24 kPa by a vacuum pump downstream of water cooled retentate. The results are given in Tables 2, 3 and 5.

Experiment 3

Membrane B was then tested with a vaporous feed stream of 90 wt % water and 10 wt % organic compounds at 135° C. This feed stream was an aqueous by-product stream from a wood bark pyrolysis process. It contained hundreds of organic compounds. The organic compounds in greatest concentration were acetic acid, hydroxypropanone and furfural. Feed was to the bore side of the capillary tube. The permeate pressure was maintained at 7.1 kPa by a vacuum pump downstream of water cooled condenser. The feed pressure was maintained at 29 kPa by a vacuum pump downstream of water cooled retentate. The experiments were allowed to run continuously until steady state conditions were obtained and the permeability and selectivity data were constant which was 6-10 hours. The results are given in Tables 2 and 3.

TABLE 2

| Exp. # | Treated mixture | Feed flow rate kg/h | Permeate flow rate kg/h | Retentate flow rate kg/h | Feed water conc. wt % | Permeate water conc. wt % | Retentate water conc. wt % |
|---|---|---|---|---|---|---|---|
| 1 | water/ethanol/fusel oil | 0.308 | 0.063 | 0.245 | 20 | 93.00 | 0.91 |
| 2 | water/acetic acid | 0.578 | 0.317 | 0.261 | 95 | 99.96 | 89.00 |
| 3 | water/pyrolysis compounds | 0.473 | 0.355 | 0.118 | 90 | 99.86 | 65.00 |

TABLE 3

| Exp. # | Treated mixture | Water permeance (mol/m$^2$sPa) × 10$^{-7}$ | Vapour permeance selectivity water/organic |
|---|---|---|---|
| 1 | water/ethanol/fusel oil | 1.8 | 290 |
| 2 | water/acetic acid | 7.7 | 330 |
| 3 | water/pyrolysis compounds | 7.5 | 390 |

Experiments 4, 5, 6, 7 and 8

In experiments 4, 5, 6, 7 and 8, the membranes C, D, E, F, and G, respectively were placed in a test cell. The exposed membrane surface area was 27 cm$^2$. These membranes were then tested with a vaporous feed stream of 90 wt % water and 10 wt % acetic acid at 85° C. The permeate pressure was maintained at 4 kPa by a vacuum pump downstream of water cooled condenser. The feed pressure was maintained at 35 kPa by a vacuum pump downstream of water cooled retentate. The experiments were allowed to run continuously until steady state conditions were obtained and the permeability and selectivity data were constant which was 3-8 days. The results of these experiments are given in Table 4.

TABLE 4

| Exp. # | Membrane composition (%) | Water permeability (mol · m/m² · s · Pa) × 10⁻¹³ | Vapour permeability selectivity water/acetic acid |
|---|---|---|---|
| 4 | PI (100) | 3.19 | 290 |
| 5 | PI/SPEEK (79/21) | 2.94 | 290 |
| 6 | PI/SPEEK (20/80) | 1.08 | 340 |
| 7 | SPEEK (100) | 2.49 | 290 |
| 8 | PI/SPEEK-Na+ (49/51) | 5.62 | 170 |

Experiment 9

Membrane H was tested with a vaporous feed stream of 95 wt % water and 5 wt % acetic acid at 85° C. Feed was to the bore side of the capillary tube. The permeate pressure was maintained at 5 kPa by a vacuum pump downstream of water cooled condenser. The feed pressure was maintained at 37 kPa by a vacuum pump downstream of water cooled retentate. The results are given in Table 5.

Experiment 10

Membrane I was tested with a vaporous feed stream of 95 wt % water and 5 wt % acetic acid at 95° C. Feed was to the bore side of the capillary tube. The permeate pressure was maintained at 8 kPa by a vacuum pump downstream of water cooled condenser. The feed pressure was maintained at 34 kPa by a vacuum pump downstream of water cooled retentate. The results are given in Table 5.

Experiment 11

Membrane J was tested with a vaporous feed stream of 95 wt % water and 5 wt % acetic acid at 85° C. Feed was to the bore side of the capillary tube. The permeate pressure was maintained at 7.5 kPa by a vacuum pump downstream of water cooled condenser. The feed pressure was maintained at 40 kPa by a vacuum pump downstream of water cooled retentate. The results are given in Table 5.

Experiment 12

Membrane K was tested with a vaporous feed stream of 95 wt % water and 5 wt % acetic acid at 85° C. Feed was to the bore side of the capillary tube. The permeate pressure was maintained at 7 kPa by a vacuum pump downstream of water cooled condenser. The feed pressure was maintained at 36 kPa by a vacuum pump downstream of water cooled retentate. The results are given in Table 5.

Experiment 13

Membrane L was tested with a vaporous feed stream of 95 wt % water and 5 wt % acetic acid at 85° C. Feed was to the bore side of the capillary tube. The permeate pressure was maintained at 7 kPa by a vacuum pump downstream of water cooled condenser. The feed pressure was maintained at 36 kPa by a vacuum pump downstream of water cooled retentate. The results are given in Table 5.

Experiment 14

Membrane M was tested with a vaporous feed stream of 90 wt % water and 10 wt % acetic acid at 85° C. Feed was to the bore side of the capillary tube. The permeate pressure was maintained at 5 kPa by a vacuum pump downstream of water cooled condenser. The feed pressure was maintained at 39 kPa by a vacuum pump downstream of water cooled retentate. The results are given in Table 5.

TABLE 5

| Exp. # | Casting solution composition wt. % | Water permeance (mol/ m²sPa) × 10⁻⁷ | Vapour permeance selectivity water/ acetic acid |
|---|---|---|---|
| 2 | BTDA:ODA/PVP/GLY/NMP 12/1/20/67 | 7.7 | 330 |
| 9 | BTDA:ODA/PVP/GLY/NMP 15/1/16/68 | 6.3 | 290 |
| 10 | BTDA:ODA/SPEEK/H₂O/NMP 16/1/5/78 | 7.0 | 60 |
| 11 | PMDA:ODA:DDS/PVP/GLY/NMP 16/2/18/64 | 2.1 | 200 |
| 12 | BPDA:ODA/PVP/GLY/NMP 13/1/13/73 | 2.7 | 140 |
| 13 | PMDA:TPE-R/PVP/GLY/NMP 21/2/14/63 | 2.1 | 410 |
| 14 | PMDA:ODA/GLY/NMP 17/20/63 | 4.5 | 79 |

Experiment 15

Membrane A was then tested with the pure dry gases listed in Table 6 and pure water vapor at 20, 85 and 140° C. The feed pressure was 204 kPa and the retentate pressure was 101 kPa for all cases except water vapor at 85° C. For this case, the feed pressure was 43 kPa and the permeate pressure was 10 kPa. The results are given in Table 6

TABLE 6

| Gas | Permeance at 20° C. (mol/ m²sPa) × 10⁻¹¹ | Permeance at 85° C. (mol/ m²sPa) × 10⁻¹¹ | Permeance at 140° C. (mol/ m²sPa) × 10⁻¹¹ |
|---|---|---|---|
| N₂ | 3.66 | 25.8 | 118 |
| O₂ | 22.00 | 132 | 396 |
| CO₂ | 82.40 | 325 | 700 |
| H₂ | 404.00 | 2390 | 6070 |
| H₂O | — | 55000 | 36000 |

Experiment 16

The membrane N was tested continuously for a period of six days with a vaporous feed stream composed of water/ ethanol/fusel oil of 40/53/7 weight % respectively. Feed was to the bore side of the capillary tubes. The permeate pressure was maintained at 8 kPa by a vacuum pump downstream of a water cooled permeate condenser. The feed pressure was maintained at 410 kPa and there was negligible pressure drop across the module from the feed inlet to the retentate outlet. The experiment was carried out at a temperature of 145° C.

Figures 6, 7:
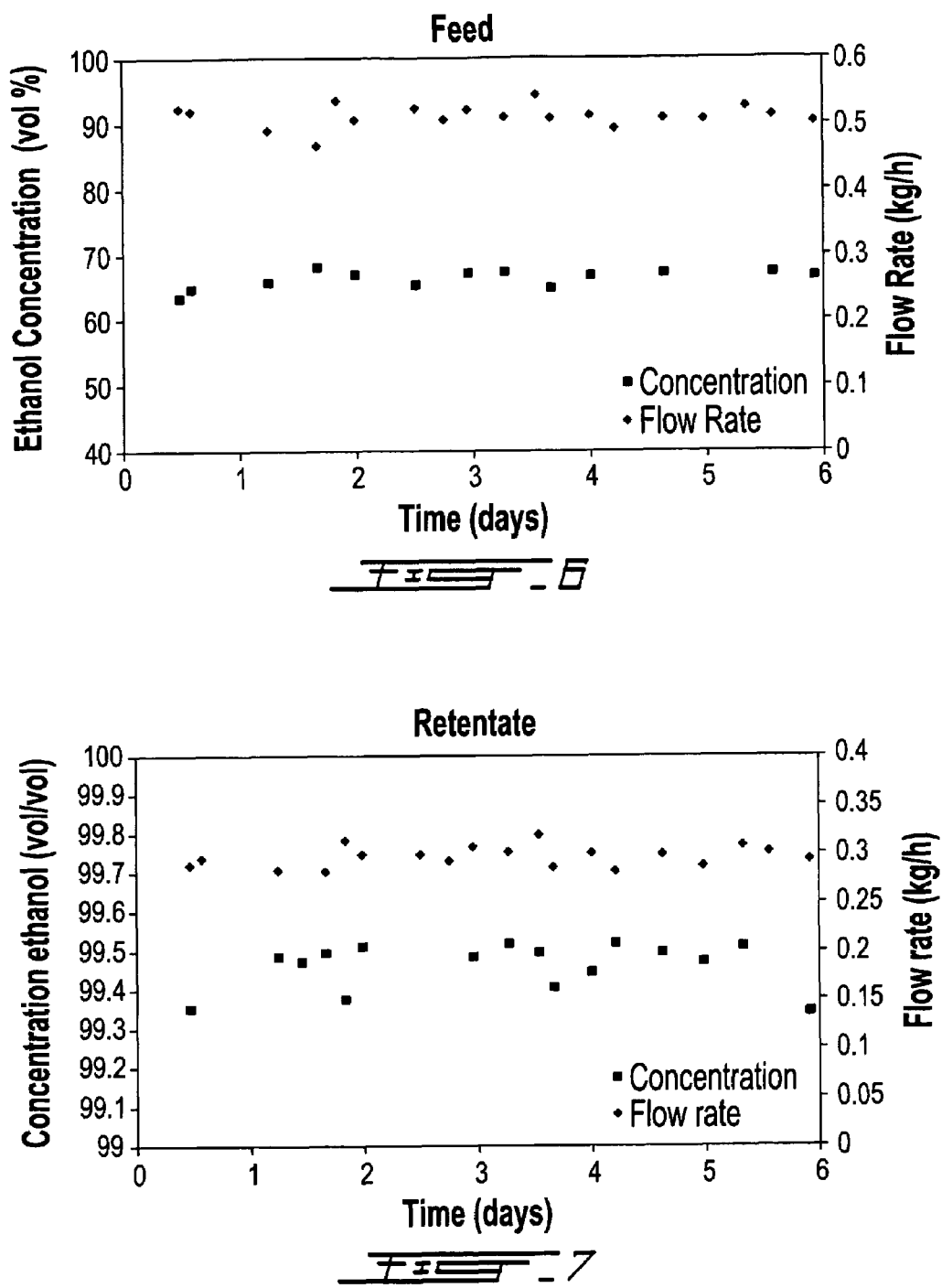
FIG. 6 is a graph obtained from a performance test carried out on a membrane according to a preferred embodiment of the invention, wherein the test has been carried out during a continuous period of time.
FIG. 7 is another graph obtained from the test carried out on the membrane tested in the graph FIG. 6.
Figure 8:
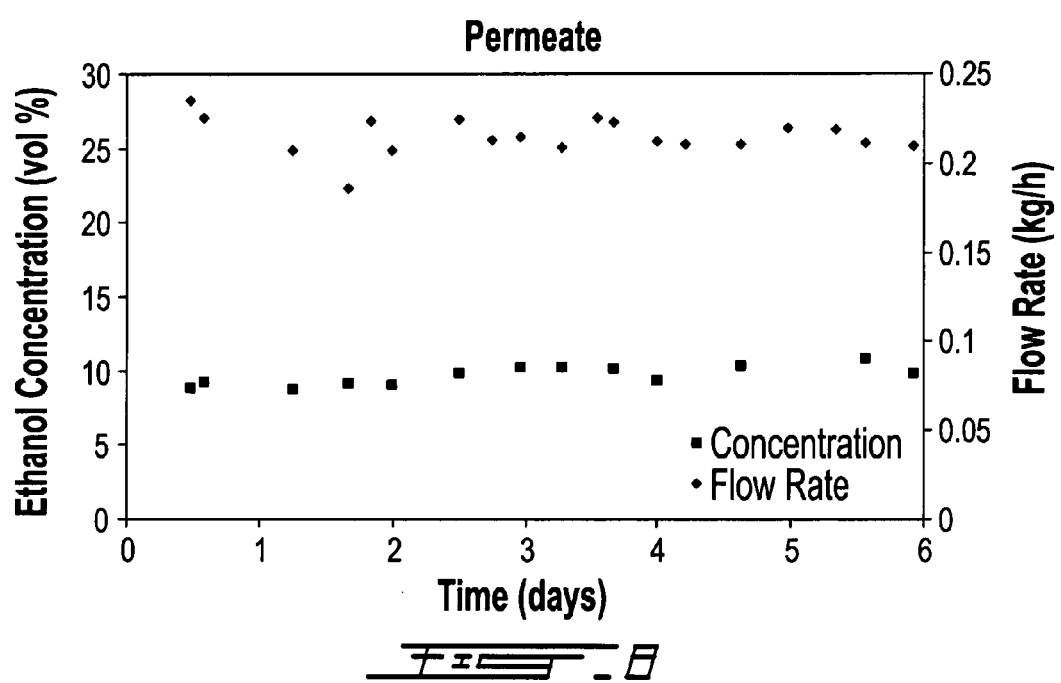
FIG. 8 is still another graph obtained from the test carried out on the membrane tested in the graph FIG. 6.

The results obtained in experiment 16 are shown in FIGS. 6 to 8. It can be seen from these figures that there was no loss in performance of the membrane over the testing period. The retentate stream (see FIG. 7) had an average water concentration of 0.66 wt % throughout the testing period. Variations in the concentrations were attributed primarily to errors in sample collection. The permeate stream (see FIG. 8) average about 92.8 wt % water, and the feed stream (see FIG. 6) averaged 39.8 wt % water. The concentrations indicated as ethanol in the results include the fusel oil. It can thus be inferred that these membranes can also separate an ethanol/ water mixture.

Experiment 17

Capillary tubes J were soaked for three days at 25° C. and their properties were measured as saturated tubes. In particular, the tubes J have been saturated in water, ethanol, and a strong organic solvent (NMP) for a period of three days at room temperature. These tubes maintained good mechanical strength. The obtained results can be seen in Table 7.

TABLE 7

| Conditions | Burst Pressure psi | Tensile Force kg/mm$^2$ | Elongation at Break % |
|---|---|---|---|
| Dry | 830 | 1.84 | 30 |
| Water saturated | 712 | 1.71 | 48 |
| Ethanol saturated | 560 | 1.39 | 60 |
| NMP saturated | 240 | 0.98 | 83 |

Experiment 18

The permeabilities of several compounds i.e. benzene, methane, nitrogen, oxygen, carbon dioxide and water were determined with membrane O at 50° C. Feed was to the inside of the capillary tubes at 800 kPa. The permeate side of the capillary tubes was maintained at atmospheric pressure. For methane, nitrogen, oxygen and carbon dioxide, pure gas permeances were determined. The permeance for humidified methane given in Table 8 was determined in the presence of water vapor with a concentration of 2300 ppm which corresponds to a relative humidity of aproximately 15%. The permeance for water was determined with a nitrogen feed stream containing 1600 ppm water at 800 kPa. The permeate side was swept with nitrogen at atmospheric pressure. The permeance for benzene was determined with a nitrogen feed stream containing 9900 ppm of benzene at 800 kPa. The permeate side was swept with nitrogen at atmospheric pressure. The results given in Table 8 show the permenace results obtained for benzene, methane, nitrogen, oxygen, carbon dioxide and water. Table 8 also clearly shows that the membrane O has an exceptional selectivity for water over the other components listed therein. Thus, such a membrane can be very useful for concentrating a composition comprising water and benzene, methane, nitrogen, oxygen, carbon dioxide or mixtures thereof. Such a membrane can be particularly useful for purifying and/or refining natural gas (or methane) by removing water therefrom.

TABLE 8

| Compounds | Permeance at 50° C. (mol/m$^2$sPa) | Permenace selectivity water/compound |
|---|---|---|
| Benzene | $6.6 \times 10^{-12}$ | 31818 |
| CH$_4$ (humidified) | $1.1 \times 10^{-11}$ | 19091 |
| CH$_4$ | $1.4 \times 10^{-11}$ | 15000 |
| N$_2$ | $1.5 \times 10^{-11}$ | 14000 |
| O$_2$ | $5.5 \times 10^{-11}$ | 3818 |
| CO$_2$ | $1.4 \times 10^{-10}$ | 1500 |
| H$_2$O | $2.1 \times 10^{-7}$ | — |

It was shown that membranes of the present invention can be useful for separating water vapor from organic vapors and various gases in a continuous operation mode. A large surface area can be obtained by potting a large number of capillary tubes together to form a bundle. A continuous feed stream enters the membrane module on the bore side or the shell side. A difference in water vapor partial pressure across the membrane is the driving force for permeation. This difference in partial pressure may be accomplished by feeding the vapor at a pressure greater than atmospheric pressure. It may also be accomplished by applying a vacuum to the permeate side or by using a sweep vapor or gas. The permeability of the membrane for water vapor is higher than for organic compounds and permanent gases. The portion of the feed which permeates across the membrane exits in a continuous permeate stream. The portion which does not permeate across the membrane exits in a continuous retentate stream.

Figure 5:
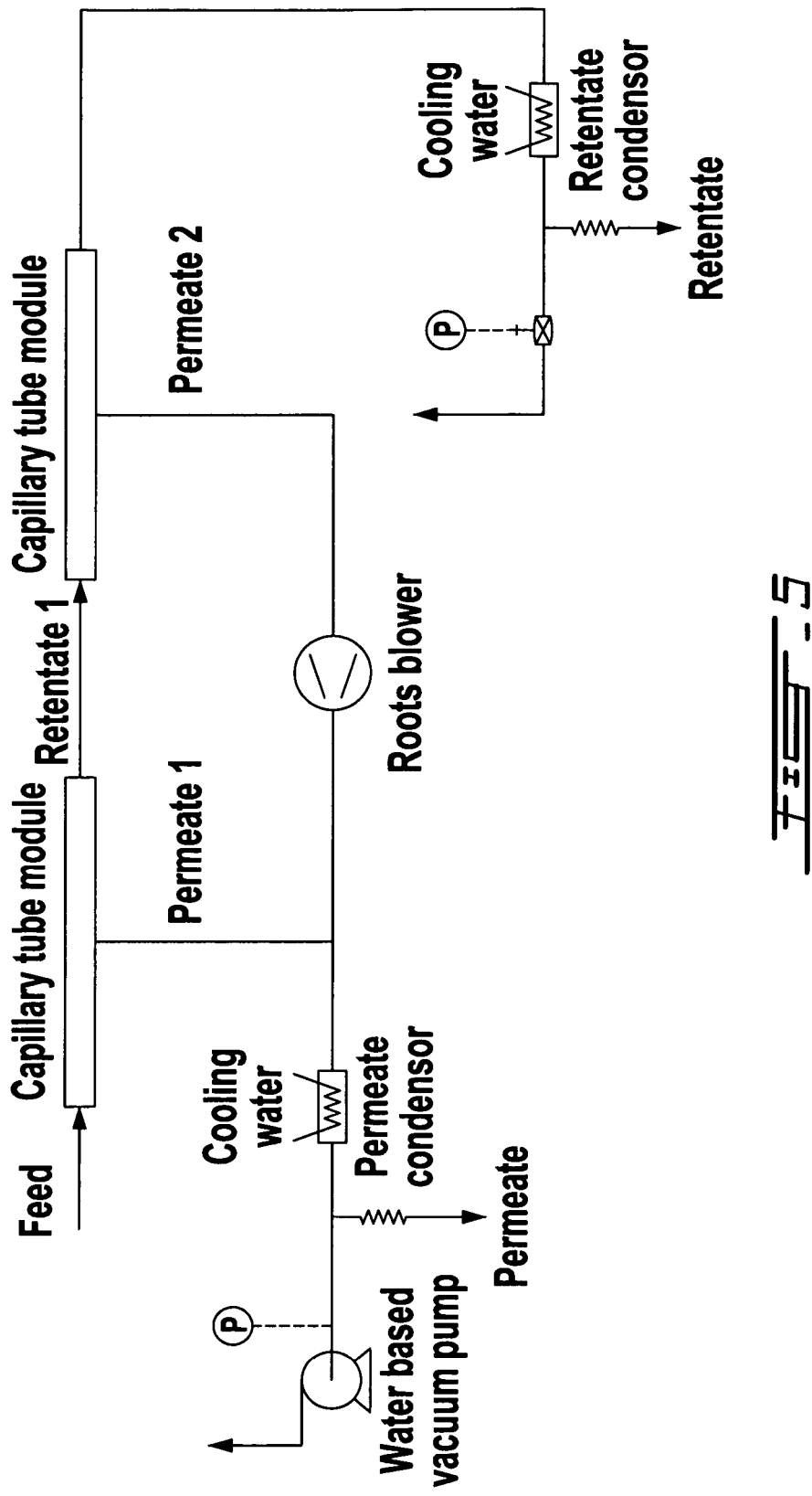
FIG. 5 is a schematic view of an apparatus using a membrane according to a further preferred embodiment of the invention.

A method to economically dehydrate an alcohol is given. Shown in FIG. 5 is an example of an apparatus for alcohol dehydration. A vapor feed stream at 400 kPa and 140° C. containing ethanol/fusel oil/water at 55/5/40 relative weight percent is fed to the capillary tube module. Both capillary tube modules or membranes are maintained at 140° C. The permeate side pressure of module 1 is determined by the cooling water temperature. In most industrial processes, the cooling water temperature can not be guaranteed to be less than 30° C. Thus, in order to be able to condense the permeate water practically prior to the vacuum pump and prevent the associated pumping costs, the permeate pressure can not be less than about 5 kPa. This pressure is controlled with a vacuum pump. The pump is preferably water based rather than oil based to be able to handle the condensation of the relatively small quantity of water vapor that escapes past the condenser. It should be noted that there is relatively light duty on this vacuum pump since the vast majority of the water vapor is condensed prior to the pump. Under these pressure conditions the water concentration at the outlet of the first module will be approximately 0.5 wt % if adequate membrane area is used. The small amount of water remaining may be removed if desired by applying a lower vacuum pressure to the permeate side of a second capillary tube module in series with the first one. The pressure is controlled by a vacuum blower to be 1 kPa for example. Under these pressure conditions, the alcohol can be dehydrated to have a final water concentration less than 0.1 wt %.

The methods of the invention can be used to prepare membranes with very thin and defect-free skins and with high water vapour permeance and an excellent permeance selectivity for water over organic compounds and gases. These methods overcome the limitations of the forced evaporation method and the delayed-demixing method of preparing defect-free skins. The methods of the invention can also be suitable for the preparation of solvent resistant membranes with exceptional chemical and hydrolytic stability. The hydrolytic resistance is very important since these membranes can be used and exposed to water vapor at elevated temperatures for prolonged periods of time. If the hydrolytic resistance is not sufficient, the polymers can undergo chain scission. This will reduce the membranes mechanical properties and cause it to become brittle. Hence, failure will occur due to the membrane bursting under the difference in pressure across the membrane. As demonstrated in Table 7, the membranes of the present invention possess very interesting mechanical properties and they are not brittle nor fragile.

The thermal stability of the obtained membranes is also exceptional, i.e. they may be used at temperatures as high as 300° C. In experiment 16 (see FIGS. 6 to 8) a membrane has been submitted for a period of six days at a temperature of 145° C. and at a permeate pressure of 8 kPA, without any loss of performance.

Advantageously, the methods of the invention do not require a solvent exchange drying process and water is used as the non-solvent for membrane casting. Moreover, since water can be used as the non-solvent, operating costs are reduced, solvent recovery is simplified and spinning operations are simplified in comparison with methods using organic solvents as coagulants. This method is suitable for preparation in a continuous mode of operation necessary to produce large membrane quantity.

It was known that water often reduce the mechanical properties of a polyamic acid polymer do to chain scission. However, in the present invention it has been shown that it is possible to use water and to maintain good mechanical properties and at the same time, having adequate rinsing or extraction of the solvent. Preferably, this can be done by precisely controlling the rinsing procedure (the time and degree of rinsing). The methods of the invention are different from the standard method (called the solvent exchange process) which has subsequent rinsing with one or more organic solvents. The solvent exchange method is used to prevent pore collapse in the skin layer. Pore collapse gives excessively thick skins which reduces permeance. In the methods of the invention, it is possible to prepare a thin skin layer membrane by preferably rinsing with water only, without the need for rinsing with an organic solvent. Advantageously, by rinsing only with water there is no need for rinsing with an organic solvent, which permits to reduce considerably the costs of production. Such an advantage is considerable with respect to other technologies.

It has been demonstrated that the membranes of the invention or membranes prepared according to the methods of the invention are defect-free. In fact, the high selectivities obtained in Tables 3, 4 and 6 clearly indicate that these membranes are defect-free.

It was found that residual solvent after rinsing can play an important beneficial role in the final mechanical properties of the membrane. As example, PVP and glycerol are water soluble and are extracted during the spinning and rinsing process. However, some residual PVP can remain in the membrane. The residual PVP can increase the selectivity. It can also increase both the elongation at break and the tensile force. However, excessive residual solvent can have negative effect on the permeability.

When polyvinylpyrrolidone (PVP) is added to polyamic acid (PM) casting solutions, it increases the selectivity of the resulting membranes and it gives greater flexibility to spinning parameters. It was also found that PVP can act to prevent defect pores in the skin layer. The use of PVP can provide greater flexibility to membrane spinning and improves quality assurance. PVP is a water soluble polymer, and can be partly extracted by water during the coagulation step. The PVP remaining after this step is immobilised in the polyimide membrane and acts as a swelling agent to reduce permeation through defect pores in the skin layer thereby increasing selectivity.

The addition of PVP can act to increase the selectivity by several means. In particular, membranes composed of polyimide/PVP blends can have an increased water absorption. Increased absorption causes increased swelling which blocks defect pores at the membrane surface. Secondly, PVP increases the degree of intwinement of the nodules at the surface. Thus in order for a species to permeate across the membrane skin, it must undergo a solution-diffusion mechanism. It must be absorbed into the dense polymer in the skin and diffuse through the dense polymer material. The selectivity of the membrane skin is thus similar to the intrinsic selectivity of the polymeric material or the selectivity of a dense film of the polymer material. Therefore, the membrane can be considered as a defect-free membrane.

Dense membrane films of sulfonated polyetheretherketone (SPEEK) when preferably cured at 250° C. with a nitrogen purge cross link are solvent resistant. During such a curing they lose approximately 50% of their sulphur content. Another application of this type of membranes is for proton exchange membranes for fuel cells for example. The cured SPEEK membranes have higher water absorption than polyetheretherketone (PEEK). SPEEK forms homogeneous casting solutions with PM and can be used to prepare blend membranes with polyimides.

It was also found that SPEEK, a polymer which has sulfone moieties in which the hydrogen ions were exchanged with other cations, forms homogeneous casting solutions with PM and can be used to prepare blend membranes with polyimides. These membranes preferably do not lose sulphur when cured at 250° C. It is also possible to protect the sulfonic acid group by neutralizing it prior to thermal conversion of the PAA. The sulfonic acid group can be recovered from the salt by an ion exchange process to obtain a solvent resistant PI/SPEEK membrane. These membranes have higher water absorption than PI/PEEK crosslinked membranes. They also have higher water vapor permeability. Preferably, SPEEK has a degree of sulfonation of 70% or higher. Salts of these polymers may also be used to form homogeneous blends with polyamic acid. These polymers have been found to have excellent miscibility with PM and form homogeneous casting solution which can be used to prepare the capillary tube membranes.

In some cases, it may be desirable to prevent crosslinking and loss of sulphur to prepare a PI/SPEEK blend membrane. This may be done by thermal conversion at lower temperature for a longer period of time or by a chemical conversion of the polyamic acid. Or by converting the salt form of the sulfonated polymer back to the acid form after curing at 250° C. Blend membranes of this type may be used as proton exchange membranes with higher thermal and chemical resistance and selectivity than SPEEK membranes.

The membranes of the present invention can have a thin dense skin which is supported on a transition layer of loosely packed nodule aggregates. Preferably, the transition zone between the skin and the membrane interior is well defined rather than being gradual. One of the reasons why the skin layer is better defined with the methods of the invention than the methods described by the prior art can be explained by the higher coagulation rate. Such a higher coagulation rate can be, without being bounded to, such an explanation, due to several factors depending of the various embodiments of the inventions. According to certain preferred embodiments, such factors are: the use of water only as the interior (bore coagulant) and external fluid, the presence of PVP or SPEEK, the low polymer concentration, and the inside tube diameter, etc.

Preferably, there are no small pores below the skin layer which are subject to collapse. Thus, the loosely packed nodule aggregates in the transition zone do not collapse significantly upon drying of water soaked membranes. The loosely packed nodule aggregates can gradually become more fused and form a highly porous lattice structure in the membrane interior.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

The invention claimed is:

1. An asymmetric integrally skinned membrane comprising a polyimide and another polymer selected from the group consisting of polyvinylpyrrolidone, sulfonated polyetheretherketones and mixtures thereof, wherein said membrane is substantially insoluble in an organic solvent, and is substantially defect-free.

2. The membrane of claim 1, wherein said polyimide is obtained by curing a polyamic acid, and wherein said polyamic acid is obtained by reacting a dianhydride monomer with a diamine monomer.

3. The membrane of claim 2, wherein said dianhydride monomer is selected from the group consisting of benzophenone tetracarboxylic dianhydride, pyromellitic dianhydride, biphenyl tetracarboxylic dianhydride, dicarboxyphenyl hexafluoropropane dianhydride, diphenylsulfone tetracarboxylic dianhydride, oxydiphthalic anhydride, and mixtures thereof.

4. The membrane of claim 2, wherein said dianhydride monomer is benzophenone tetracarboxylic dianhydride or pyromellitic dianhydride.

5. The membrane of claim 2, wherein said dianhydride monomer is benzophenone tetracarboxylic dianhydride.

6. The membrane of claim 2, wherein said diamine monomer is selected from the group consisting of oxydianiline, diaminodiphenyl sulfone, bis(aminophenyl)hexafluoropropane, bis(4-[4-aminophenoxy]phenyl)sulfone, bis(aminophenoxy)benzene, and mixtures thereof.

7. The membrane of claim 2, wherein said diamine monomer is selected from the group consisting of oxydianiline, diaminodiphenyl sulfone, and bis(aminophenoxy)benzene.

8. The membrane of claim 2, wherein said diamine monomer is oxydianiline.

9. The membrane of claim 2, wherein said dianhydride monomer is benzophenone tetracarboxylic dianhydride and said diamine monomer is oxydianiline.

10. The membrane of claim 2, wherein said dianhydride monomer is benzophenone tetracarboxylic dianhydride and said diamine monomer is diaminodiphenyl sulfone.

11. The membrane of claim 1, wherein said membrane has a vapor permeance selectivity of at least 290 for water/acetic acid, at a temperature of about 85° C.

12. The membrane of claim 1, wherein said other polymer is polyvinylpyrrolidone.

13. The membrane of claim 1, wherein said organic solvent is selected from the group consisting of N-methylpyrrolidone, dimethylacetamide, dimethylformamide, dimethylsulfoxide, $C_1$-$C_6$ alcohols, $C_1$-$C_6$ carboxylic acids, $C_1$-$C_7$ aldehydes, $C_3$-$C_8$ ketones, $C_6$-$C_8$ phenols, $C_3$-$C_{10}$ esters, $C_5$-$C_{12}$ alkanes, $C_1$-$C_4$ amines, $C_2$-$C_6$ amides, and mixtures thereof.

14. The membrane of claim 1, wherein said organic solvent is N-methylpyrrolidone.

15. The membrane of claim 1, wherein said membrane comprises at least one capillary tube having an inner surface and an outer surface, at least one of said surfaces having a defect-free skin layer thereon.

16. The membrane of claim 1, wherein said membrane has a vapor permeance for water of at least $4 \times 10^{-7}$ mol/m$^2$ sPa at a temperature of about 80° C.

17. The membrane of claim 1, wherein said membrane has a vapor permeance selectivity of at least 290 for water/ethanol, at a temperature of about 140° C.

18. The membrane of claim 1, wherein said membrane has a gas permeance selectivity of at least 6.0 for $O_2/N_2$, at a temperature of about 20° C.

19. The membrane of claim 1, wherein said membrane has a permeance selectivity of at least 2500 for water/methane, at a temperature of about 50° C.

20. The membrane of claim 1, wherein said membrane has a permeance selectivity of at least 10000 for water/methane, at a temperature of about 50° C.

21. The membrane of claim 1, wherein said membrane, when dry, has a tensile force of at least 1.5 kg/mm$^2$ at 25° C.

22. The membrane of claim 1, wherein said membrane, when dry, has an elongation at break of at least 15% at 25° C.

23. An asymmetric integrally skinned membrane comprising:
  a polyimide obtained by curing of a polyamic acid, said polyamic acid being obtained by reacting benzophenone tetracarboxylic dianhydride with a diamine monomer; and
  another polymer selected from the group consisting of polyvinylpyrrolidone, polyetheretherketones, sulfonated polyetheretherketones, sulfonated polyphenyleneoxides, sulfonated polysulfones, sulfonated polyethersulfones, sulfonated polyphenylquinoxalines, and mixtures thereof
  wherein said membrane is substantially insoluble in an organic solvent, and is substantially defect-free.

24. A method of producing an asymmetric integrally skinned polyimide membrane, comprising the steps of:
  a) extruding a casting solution comprising a polyamic acid, and another polymer selected from the group consisting of polyvinylpyrrolidone, sulfonated polyetheretherketones, and mixtures thereof, and a first organic solvent through an annulus of a spinneret at a predetermined rate using a bore coagulant comprising water so as to form an asymmetric integrally skinned membrane containing said polyamic acid;
  b) coagulating the asymmetric integrally skinned membrane obtained in step (a) in a water bath having a predetermined temperature;
  c) rinsing the coagulated membrane with water so as to remove said first organic solvent therefrom;
  d) drying the rinsed membrane; and
  e) curing the dried membrane so as to obtain said polyimide membrane,
  whereby said polyimide membrane is substantially insoluble in a second organic solvent, and is substantially defect-free.

25. A method of producing an asymmetric integrally skinned polyimide membrane, comprising the steps of:
  a) extruding a casting solution comprising a polyamic acid obtained by reacting a dianhydride with a diamine monomer, and a first organic solvent through an annulus of a spinneret at a predetermined rate using a bore coagulant comprising water so as to form an asymmetric integrally skinned membrane containing said polyamic acid;
  b) coagulating the asymmetric integrally skinned membrane obtained in step (a) in a water bath having a predetermined temperature;
  c) rinsing the coagulated membrane with water so as to remove said first organic solvent therefrom;
  d) drying the rinsed membrane; and
  e) curing the dried membrane at a temperature of about 250° C. to about 400° C. so as to obtain said polyimide membrane,
  whereby said polyimide membrane is substantially insoluble in a second organic solvent, and is substantially defect-free.

* * * * *